US012626333B2

(12) United States Patent
Omi

(10) Patent No.: US 12,626,333 B2
(45) Date of Patent: May 12, 2026

(54) MEDICAL-IMAGE PROCESSING APPARATUS, MEDICAL-IMAGE PROCESSING METHOD, AND PROGRAM FOR THE SAME

(71) Applicant: CANON KABUSHIKI KAISHA, Tokyo (JP)

(72) Inventor: Hiroyuki Omi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 18/295,147

(22) Filed: Apr. 3, 2023

(65) Prior Publication Data

US 2023/0245274 A1     Aug. 3, 2023

Related U.S. Application Data

(63) Continuation of application No. PCT/JP2021/038600, filed on Oct. 19, 2021.

(30) Foreign Application Priority Data

Oct. 26, 2020    (JP) ................................. 2020-179041

(51) Int. Cl.
| | |
|---|---|
| *G06T 3/4053* | (2024.01) |
| *G06T 3/4046* | (2024.01) |
| *G06T 5/20* | (2006.01) |
| *G06T 5/50* | (2006.01) |
| *G06T 5/60* | (2024.01) |
| *G06T 5/70* | (2024.01) |
| *G06T 7/00* | (2017.01) |

(52) U.S. Cl.
CPC .......... *G06T 3/4053* (2013.01); *G06T 3/4046* (2013.01); *G06T 5/20* (2013.01); *G06T 5/50* (2013.01); *G06T 5/60* (2024.01); *G06T 5/70* (2024.01); *G06T 7/0012* (2013.01); *G06T 2207/20081* (2013.01); *G06T 2207/20216* (2013.01); *G06T 2207/30004* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 2017/0148158 | A1* | 5/2017 | Najarian | ................... G06T 5/77 |
| 2017/0200067 | A1* | 7/2017 | Zhou | .................... G06V 30/194 |

(Continued)

FOREIGN PATENT DOCUMENTS

| | | | | | |
|---|---|---|---|---|---|
| CN | 111030952 | A | * | 4/2020 | ......... H04L 25/0254 |
| EP | 3764325 | A1 | * | 1/2021 | ............. G06N 3/045 |
| JP | 4529804 | B2 | | 8/2010 | |

(Continued)

*Primary Examiner* — Jiangeng Sun
(74) *Attorney, Agent, or Firm* — Canon U.S.A., Inc. IP Division

(57) ABSTRACT

A medical-image processing apparatus according to the present invention includes an obtaining unit configured to convert resolution of a medical image of a first resolution subjected to a noise reduction process to obtain a medical image of a second resolution lower than the first resolution and a training unit configured to train a learning model using training data including the medical image of the first resolution subjected to the noise reduction process and the medical image of the second resolution.

14 Claims, 9 Drawing Sheets

(56) References Cited

U.S. PATENT DOCUMENTS

| | | | |
|---|---|---|---|
| 2017/0213321 A1* | 7/2017 | Matviychuk | ......... G06V 10/772 |
| 2020/0286214 A1* | 9/2020 | Kaneko | ................. G06T 11/003 |

FOREIGN PATENT DOCUMENTS

| | | | | |
|---|---|---|---|---|
| JP | 6276901 | B1 | 2/2018 | |
| JP | 2019212050 | A | 12/2019 | |
| JP | 2020141908 | A | 9/2020 | |
| JP | 2020179041 | A | 11/2020 | |
| WO | WO-2016166199 | A1 * | 10/2016 | .......... G06T 1/0007 |
| WO | 2019204406 | A1 | 10/2019 | |
| WO | 2020175446 | A1 | 9/2020 | |

* cited by examiner

Figure 7:
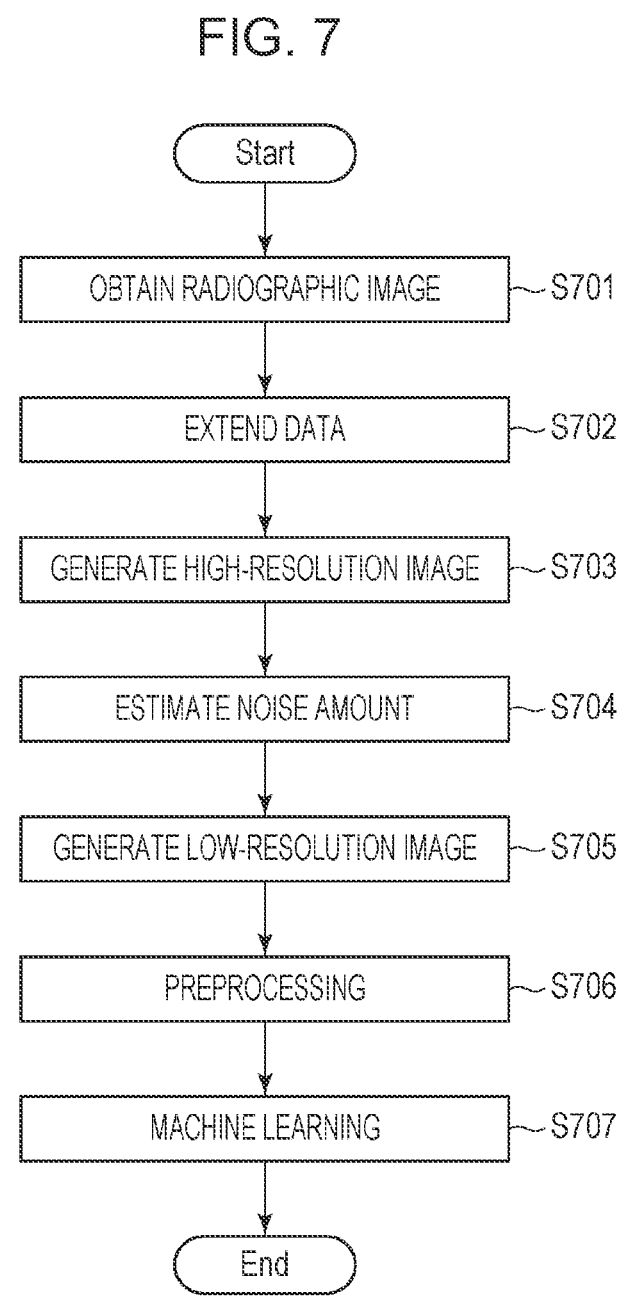

Start

OBTAIN RADIOGRAPHIC IMAGE — S701

EXTEND DATA — S702

GENERATE HIGH-RESOLUTION IMAGE — S703

ESTIMATE NOISE AMOUNT — S704

GENERATE LOW-RESOLUTION IMAGE — S705

PREPROCESSING — S706

MACHINE LEARNING — S707

End

MEDICAL-IMAGE PROCESSING APPARATUS, MEDICAL-IMAGE PROCESSING METHOD, AND PROGRAM FOR THE SAME

CROSS-REFERENCE TO RELATED APPLICATIONS

This application is a Continuation of International Patent Application No. PCT/JP2021/038600, filed Oct. 19, 2021, which claims the benefit of Japanese Patent Application No. 2020-179041, filed Oct. 26, 2020, both of which are hereby incorporated by reference herein in their entirety.

TECHNICAL FIELD

The present invention relates to a medical-image processing apparatus, a medical-image processing method, and a program for the same.

BACKGROUND ART

X-ray diagnosis and treatment based on radiography are widely performed in medical front, and digital diagnostic imaging based on radiographic images captured using a flat panel sensor (hereinafter referred to as "sensor") is in widespread use all over the world. The sensor can image output immediately and can therefore capture not only still images but also moving images. Furthermore, an increase in the resolution of the sensor allows imaging that provides more detailed information.

In contrast, reduced-resolution radiographic images are sometimes obtained to reduce radiation exposure to the examinee. One example is a use case in which X rays are applied for a long time, such as moving images. In this case, X-ray dose per pixel is increased by treating multiple pixels of output data from the sensor as one pixel. This allows the overall X-ray radiation to be reduced, thereby reducing radiation exposure to the examinee.

However, the reduction in resolution causes loss of detailed information in the radiographic images, such as lesion information and information for accurate positioning of the imaging apparatus.

One example of a process for decompressing detailed information in low-resolution images (increasing the resolution) is superresolution processing. Known examples of the superresolution processing include a method for converting multiple low-resolution images to a high-resolution image and a method for associating the features of a low-resolution image with the features of a high-resolution image and providing a high-resolution image on the basis of the information (PTL 1). A recent example method for associating features is machine learning. In particular, supervised learning using a convolutional neural network (CNN) is rapidly becoming popular because of their high performance (PTL 2). Superresolution processing using the CNN decompresses detailed information in input low-resolution images using training parameters created by means of supervised learning. The superresolution processing is also applied to medical images.

Superresolution processing using the CNN makes an inference using a low-resolution image as an input and outputs a superresolution image as an inference. A high-resolution image is used as a correct image for training. For this reason, multiple sets of a high-resolution image and a low-resolution image are prepared as training data. An example of the image is a medical image. Preparing medical images allows the superresolution processing to be applied to medical images. However, for example, radiographic images are noise dominant images having a low signal/noise (S/N) ratio in a low dose area. For this reason, if the CNN is trained for radiographic images, the CNN learns such that not only the structure of the object, which is a signal component, but also a noise component is decompressed as information to be decompressed. Accordingly, superresolution processing using training parameters obtained by performing the learning generates a superresolution image in which noise is superimposed. Therefore, even if an image in a high dose area with low noise is input, a noisy superresolution image is output, causing degradation of image quality although with improved resolution.

CITATION LIST

Patent Literature

PTL 1 Japanese Patent No. 4529804
PTL 2 Japanese Patent No. 6276901
PTL 3 Japanese Patent Laid-Open No. 2020-141908

SUMMARY OF INVENTION

The present invention is made in view of the above problems, and an object is to build a learning model capable of outputting medical images of improved resolution and reduced noise.

Another object of the present invention is to offer operational advantages that are provided using the configurations of the following embodiments and that are not provided using known techniques.

A medical-image processing apparatus according to the present invention includes an obtaining unit configured to convert resolution of a medical image of a first resolution subjected to a noise reduction process to obtain a medical image of a second resolution lower than the first resolution and a training unit configured to train a learning model using training data including the medical image of the first resolution subjected to the noise reduction process and the medical image of the second resolution.

Further features of the present invention will become apparent from the following description of exemplary embodiments with reference to the attached drawings.

BRIEF DESCRIPTION OF DRAWINGS

FIG. 4B is a flowchart for an example of the learning procedure of the medical-image processing apparatus according to the first embodiment.

FIG. 7 is a flowchart of an example of the processing procedure of the medical-image processing apparatus according to a third embodiment.

DESCRIPTION OF EMBODIMENTS

The following embodiments illustrate a representative example in which radiographic images are used as an example of medical images. More specifically, an example in which radiographic images obtained using simple roentgenography are used as an example of the radiographic images will be described. The medical images applicable to the embodiments are illustrative only, and other medical images can also be suitably applied. Examples include medical images obtained using a computed tomography (CT) scanner, a magnetic resonance imaging (MRI) scanner, a three-dimensional ultrasonic imaging system, a photoacoustic tomography scanner, a positron emission tomography (PET)/single photon emission computed tomography (SPECT) scanner, an optical coherence tomography (OCT) scanner, and a digital radiography scanner.

The following embodiments illustrate building of a learning model based on supervised learning using a convolutional neural network (CNN) in which a low-resolution medical image, which is input data, and a high-resolution medical image, which serves as correct data, are used as training data. For this reason, the learning model is hereinafter referred to as CNN. Not the learning using the CNN but any machine learning capable of building a learning model capable of outputting medical images with improved resolution and reduced noise may be used.

First Embodiment

A medical-image processing apparatus according to this embodiment performs learning using a high-resolution radiographic image subjected to a noise reduction process and a low-resolution radiographic image generated from the high-resolution radiographic image subjected to the noise reduction process. The medical-image processing apparatus is configured to build a learning model for creating a high-resolution image from the input radiographic image.

Figure 1:
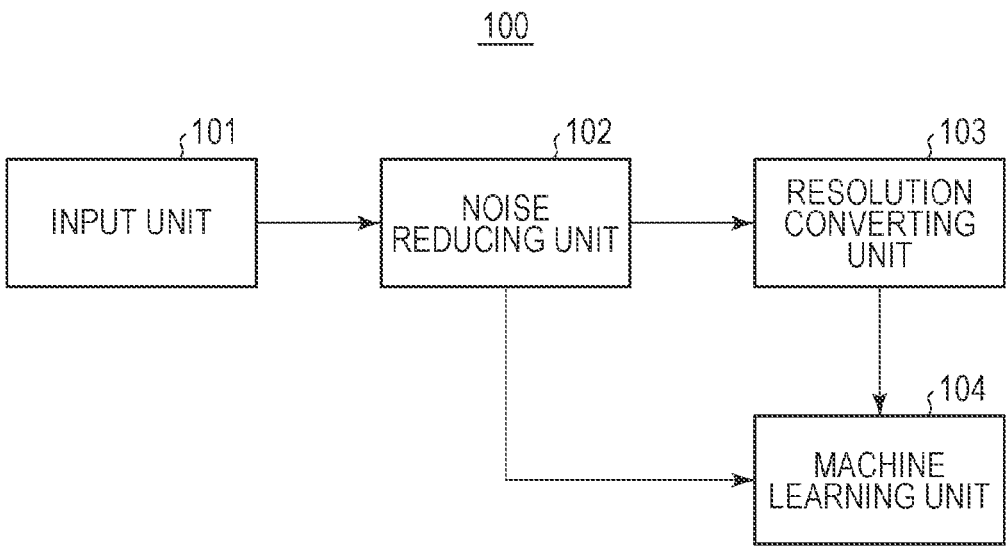
FIG. 1 is a block diagram of an example of the functional configuration of a medical-image processing apparatus according to a first embodiment.

FIG. 1 shows a block diagram of a medical-image processing apparatus 100 according to an embodiment of the present invention. The medical-image processing apparatus 100 includes an input unit 101, a noise reducing unit 102, a resolution converting unit 103, and a machine learning unit 104.

The input unit 101 obtains a radiographic image from an external apparatus and outputs a high-resolution radiographic image. The noise reducing unit 102 receives the high-resolution radiographic image as an input and outputs a high-resolution radiographic image with reduced noise. The resolution converting unit 103 receives the noise-reduced high-resolution radiographic image as an input and performs size-reduction processing thereon to output a noise-reduced low-resolution radiographic image. The machine learning unit 104 receives the noise-reduced high-resolution radiographic image and the noise-reduced, low-resolution radiographic image as an input and performs training of superresolution processing CNN to update the parameters of the CNN.

Figure 2A:
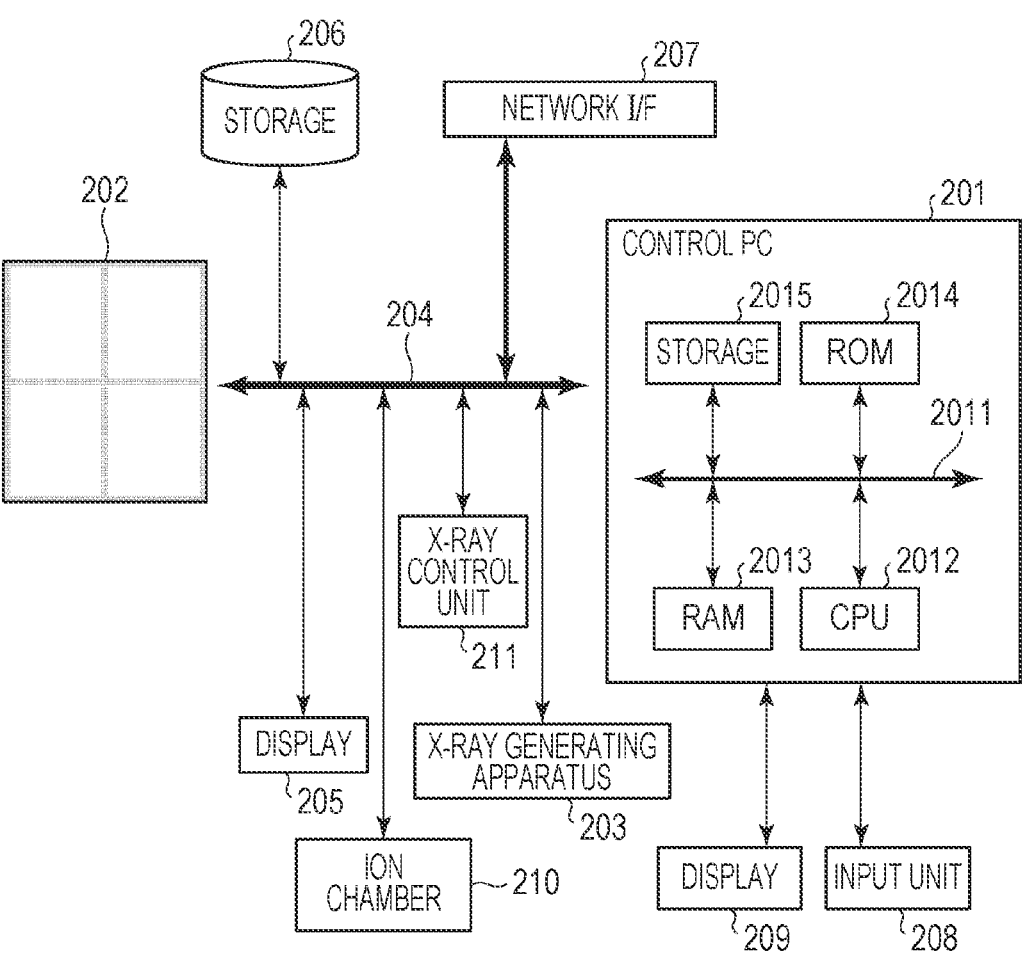
FIG. 2A is a diagram illustrating an example of the hardware configuration of the medical-image processing apparatus according to the first embodiment.
Figure 2B:
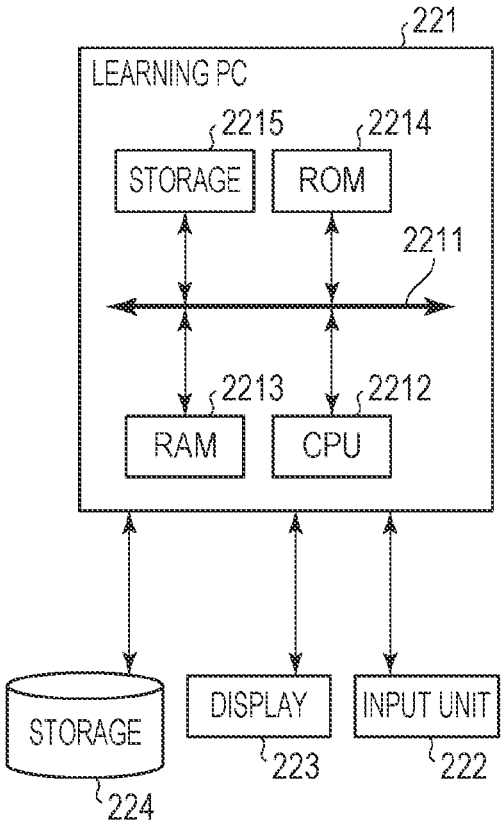
FIG. 2B is a diagram illustrating an example of the hardware configuration of the medical-image processing apparatus of the first embodiment.

FIGS. 2A and 2B are diagrams illustrating an example of the hardware configuration of the medical-image processing apparatus 100 in FIG. 1. In the configuration example in FIG. 2A, a radiographic image needed for learning is obtained. A control personal computer (PC) 201 and an X-ray sensor 202 are connected by a Gigabit Ether 204. The signal line may be not the Gigabit Ether but a controller area network (CAN) or an optical fiber. The Gigabit Ether 204 connects to an X-ray generating apparatus 203, a display 205, a storage 206, a network interface 207, an ion chamber 210, and an X-ray control unit 211. The control PC 201 is configured such that, for example, a central processing unit (CPU) 2012, a random access memory (RAM) 2013, a read only memory (ROM) 2014, and a storage 2015 are connected to a bus 2011. The control PC 201 connects to an input unit 208 using a universal serial bus (USB) or a PS/2 port and connects to a display 209 using a DisplayPort or a digital visual interface (DVI). The control PC 201 is used to send commands to the X-ray sensor 202 and the display 205. In the control PC 201, processing details for each image-capturing mode are stored in the storage 2015 as software modules. The processing details are read to the RAM 2013 according to instruction means (not shown) for execution. The processed image is sent to the storage 2015 in the control PC 201 or the storage 206 outside the control PC 201 for storage.

Next, in the configuration example of FIG. 2B, the training of the CNN is performed. A learning PC 221 is configured such that, for example, a CPU 2212, a RAM 2213, a ROM 2214, and a storage 2215 are connected to a bus 2211. The learning PC 201 connects to an input unit 222 using a USB or PS/2, connects to a display 223 using DisplayPort or DVI, and connects to a storage 224 using a USB. The components 101, 102, 103, and 104 shown in FIG. 1 are stored in the storage 2215 as software modules. It is needless to say that the components 101, 102, 103, and 104 shown in FIG. 1 may be implemented as a dedicated image processing board. Optimum implementation for the purpose may be performed. The training images obtained in FIG. 2A may be input from the storage 224 or a storage (not shown) via a network I/F.

Figure 3:
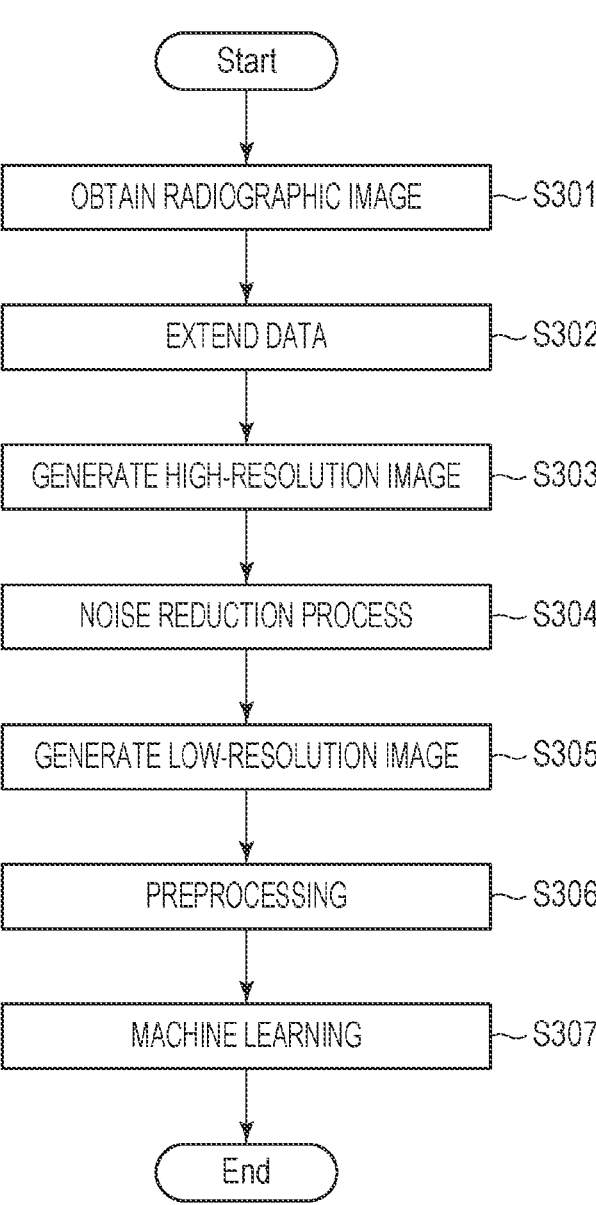
FIG. 3 is a flowchart for an example of the processing procedure of the medical-image processing apparatus according to the first embodiment.

The processing will be described with reference to the functional block diagram in FIG. 1 and the flowchart in FIG. 3 illustrating the overall processing procedure.

S301: Obtaining Radiographic Image

First at S301, the input unit 101 obtains a radiographic image.

S302: Extending Data

Next at S302, the input unit 101 performs data extension of the obtained radiographic image. The data extension refers to rotating or reversing one image into an image having different features. If the size of the high-resolution image input to the CNN is less than or equal to the size of the radiographic image obtained by the input unit 101, clipping is also included. The data extension is performed using a combination of clipping, rotating, and reversing.

S303: Creating High-Resolution Image

Next at S303, the input unit 101 outputs the data-extended image as a high-resolution image to the noise reducing unit 102. The high-resolution image corresponds to a correct image for a superresolution image to be output by the CNN.

S304: Noise Reduction Process

Next at S304, the noise reducing unit 102 performs a noise reduction process on the high-resolution image and outputs a noise-reduced high-resolution image. For noise reduction, the noise reducing unit 102 performs, for example, spatial $\varepsilon$ filtering. The $\varepsilon$ filtering is a method for reducing only noise while keeping the edge structure, which is expressed as Eq. 1.

$$HN(x, y) = H(x, y) - \sum_{i=-n}^{n} \sum_{j=-m}^{m} w(i, j) \cdot F(H(x, y) - H(x+i, y+j))$$

$$\sum_{i=-n}^{n} \sum_{j=-m}^{m} w(i, j) = 1$$

$$F(k) = \begin{cases} \varepsilon & (\varepsilon \geq |k|) \\ k & (\text{otherwise}) \end{cases}$$

where H is a high-resolution image, HN is a noise-reduced high-resolution image, and $\varepsilon$ is a threshold for isolating the edge and the noise from each other. The threshold for isolating the edge and the noise may be any value selected by the user or may be calculated using a radiation noise model, described below in a second embodiment. The $\varepsilon$ filtering is an example of nonlinear spatial filtering, for example, NL-Means filtering or median filtering.

For multiple times of image capturing of the same object with the same alignment, averaging may be performed as in Eq. 2 for noise reduction.

$$HN(x, y) = \frac{1}{n} \sum_{i=1}^{n} H(i, x, y)$$

where H(x, y) is a high-resolution image, and n is the number of images added. In other words, noise is reduced by averaging the radiographic image of a first resolution and a plurality of radiographic images captured under the same radiographic conditions as those of the radiographic image of the first resolution.

Noise reduction may use a CNN (PTL 3).

S305: Generating Low-Resolution Image

Next at S305, the resolution converting unit 103 receives the noise-reduced high-resolution image as an input and performs size-reduction processing thereon to output a noise-reduced low-resolution image. The method of size reduction depends on the relationship between the low-resolution image to which the superresolution processing is applied and the high-resolution image. For example, if the low-resolution image in the applied system is obtained by averaging high-resolution images, the size reduction is performed by averaging. In other words, a size reduction method that fits the details of training the CNN is selected. This applies to the reduction percentage. For training the CNN for doubling the resolution, the reduction percentage is set to one half.

S306: Preprocessing

Next at S306, the machine learning unit 104 preprocesses the noise-reduced high-resolution image and the noise-reduced low-resolution image to output a preprocessed high-resolution image and a preprocessed low-resolution image. The preprocessing is processing for enhancing the robustness of the CNN. Examples include normalization within the maximum value and the minimum value of the image and regularization with the average value of the image at 0 and the standard deviation at 1.

S307: Machine Learning

Finally at S307, the machine learning unit 104 performs training of the CNN using the preprocessed low-resolution image and the preprocessed high-resolution image.

The preprocessed low-resolution image and the preprocessed high-resolution image used at S307 may be generated by the medical-image processing apparatus 100 in the steps from S301 to S306 or may be generated by a different medical-image processing apparatus. The preprocessed low-resolution image and the preprocessed high-resolution image, if stored in advance in the storage 2015 of the medical-image processing apparatus 100, may be obtained from the storage 2015.

The details of the learning procedure will be described with reference to FIGS. 4A and 4B.

S401: Inference Processing

At S401, the machine learning unit 104 builds a learning model by performing supervised learning using a set of input data and output data as training data. The training data is a set of low-resolution images 411, or input data, and high-resolution images 415, or correct data corresponding thereto. The machine learning unit 104 performs inference processing on the low-resolution images 411 using the parameters of a CNN 412 in the course of learning and outputs super-resolution images 414 as inferences (S401). The CNN 412 has a structure in which multiple processing units 413 are freely connected. Example processes performed by the processing units 413 include a convolutional operation, a normalization process, and processes using an activating function such as ReLU or Sigmoid, for which a parameter set for describing the individual processing details is present. The parameters can take various structures. For example, parameter sets are connected in about three to hundreds layers in the order of convolutional operation, normalization, and activating functions.

S402: Calculating Loss Function

Next at S402, the machine learning unit 104 calculates a loss function from the superresolution images 414, which are inferences, and the high-resolution images 415. The loss function may be any function, such as a square error or a cross entropy error.

S403: Error Backpropagation

Next at S403, the machine learning unit 104 performs error backpropagation starting from the loss function calculated at S402 to update the parameter set of the CNN 412.

S404: Determining Whether to End Learning

Finally at S404, the machine learning unit 104 determines whether to end the learning, and if the learning is to be continued, goes to S401. Repeating the processes from S401 to 403 while changing the low-resolution images 411 and the high-resolution images 415 allows the update of the parameters of the CNN 412 to be repeated so that the loss function is decreased, thereby increasing the accuracy of the machine learning unit 104. When the learning is sufficiently advanced and is determined to be ended, the process is completed. The determination whether to end the learning is performed on the basis of criteria set for the problems, for example, that the accuracy of the inference has reached a fixed value or greater without occurrence of over-training or that the loss function has reached a fixed value or less.

Thus, the processing of the medical-image processing apparatus 100 is performed.

Thus, the parameters of the CNN are updated according to the result of comparison between the superresolution images that the CNN obtains from the preprocessed low-resolution images and the preprocessed high-resolution images. Both the preprocessed low-resolution images and the preprocessed high-resolution images are reduced in noise component and are therefore dominant in signal component. Thus, an increase in the resolution of only signal components are learned.

Accordingly, the superresolution images output using the CNN parameters learned in this embodiment are reduced in noise component, and thus high-quality images are obtained. The noise reduction is preferably performed on both the low-resolution images and the high-resolution images. If either the low-resolution images or the high-resolution images contain a noise component, a noise adjusting process has to be learned in addition to the resolution increasing process. This increases the complexity of the contents of learning, causing degradation of image quality, an increase in network size (increases in resources used and performance), and so on.

The medical-image processing apparatus 100 according to this embodiment builds a learning model using the low-resolution images and the high-resolution images with reduced noise components as training data and can therefore build a learning model capable of outputting medical images with reduced noise and improved resolution.

Furthermore, inputting a medical image obtained by capturing an image of the examinee to the learning model allows generation of a medical image with reduced noise and improved resolution and also allows reduction of the network size.

Second Embodiment

Figure 5:
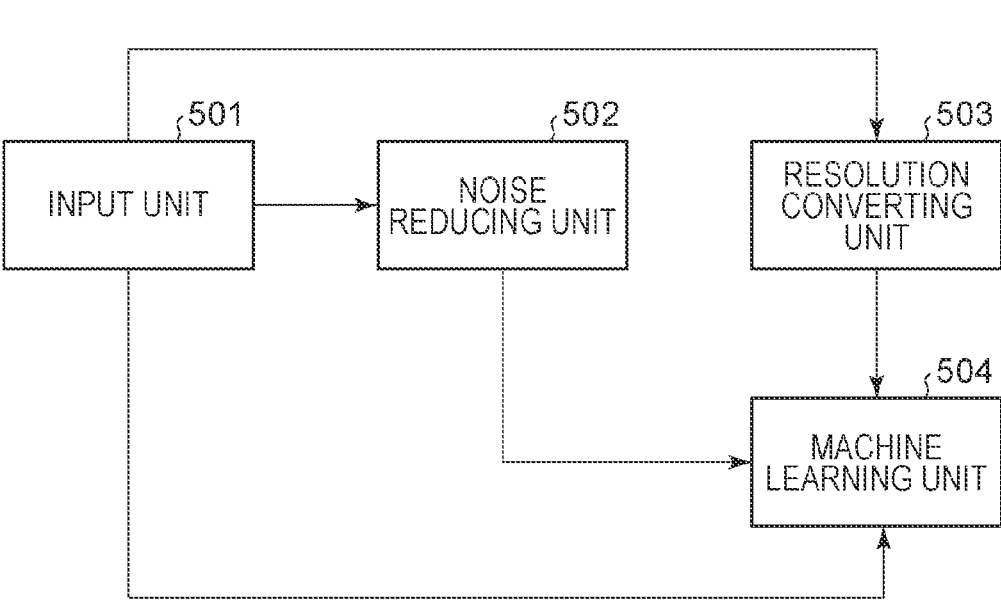
FIG. 5 is a block diagram of an example of the functional configuration of a medical-image processing apparatus according to a second embodiment.
Figure 6:
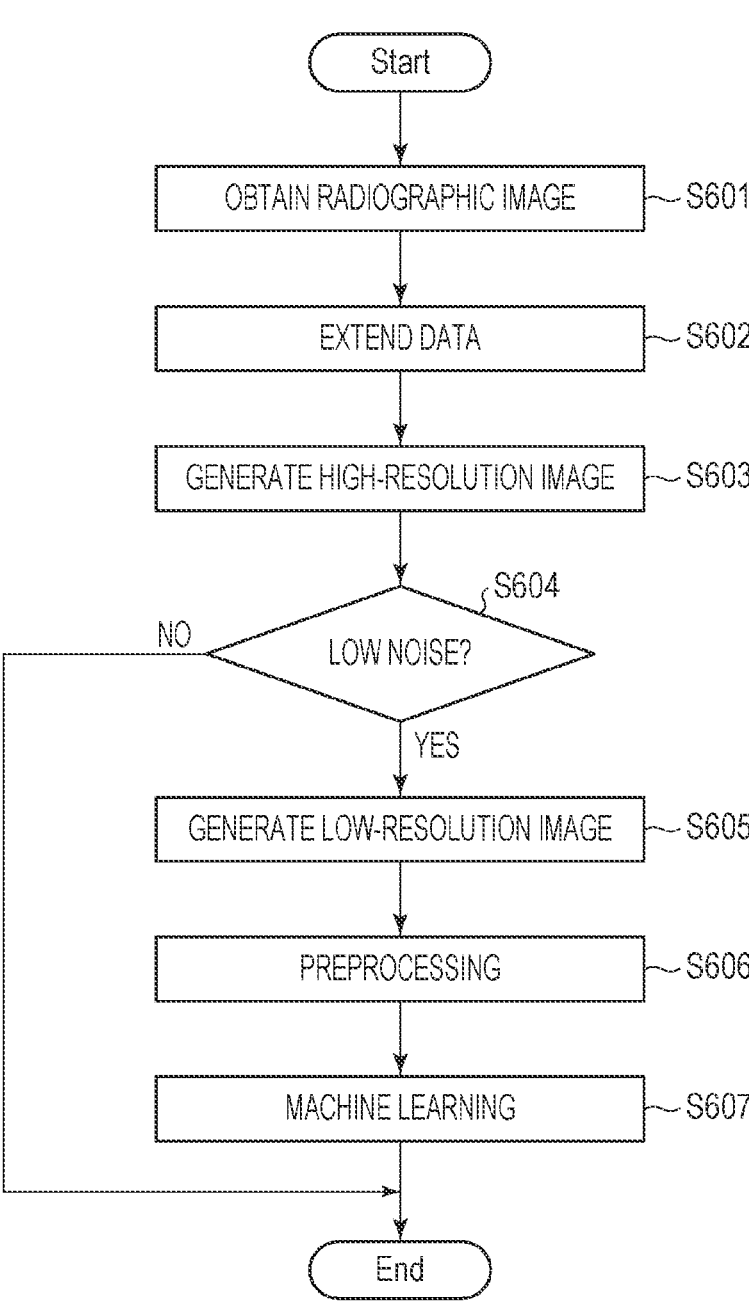
FIG. 6 is a flowchart of an example of the processing procedure of the medical-image processing apparatus according to the second embodiment.

The processing of this embodiment will be described with reference to the functional block diagram in FIG. 5 and the flowchart in FIG. 6 illustrating the overall processing procedure.

In FIG. 5, an input unit 501, a resolution converting unit 503, and a machine learning unit 504 of a medical-image processing apparatus 500 are the same as the input unit 101, the resolution converting unit 103, and the machine learning unit 104 in FIG. 1, respectively.

A noise estimating unit 502 receives high-resolution images as an input and outputs the noise amount of the high-resolution images. The noise estimating unit 502 is stored in the storage 2015, as a software module, in FIG. 2A.

The steps from S601 to S603 are the same as the steps from S301 to S303 in the first embodiment, and descriptions thereof are omitted. The step from S605 to S607 are the same as the steps from S305 to S307 in the first embodiment, and descriptions thereof are omitted.

Only the difference from the flowchart in FIG. 3 will be described.

S604: Determining Noise Amount

At S604, the noise estimating unit 502 receives the high-resolution images and estimates the amount of noise contained in the high-resolution images. The noise amount is calculated using, for example, standard deviation in a predetermined area. Standard deviations in a plurality of areas are calculated and averaged. Alternatively, the noise amount may be calculated from the physical properties of X-ray. The noise in the X-ray is roughly divided into a random quantum noise that depends on the X-ray amount and a random system noise that does not depend on the X-ray amount. The noise amount n of a pixel value x can be expressed as Eq. 3.

$$n = \sqrt{Qn(x)^2 + Sn^2}$$

$$Qn(x) = K_q \cdot (x)^{1/2}$$

where Kq is a conversion factor in calculating the amount of a ransom quantum noise from the pixel value of the radiographic image, and Sn is the amount of a random system noise, which are obtained in advance.

The calculated noise amount may be used as it is. However, the noise amount of X-ray depends on the X-ray dose, which makes it difficult to determine how the noise amount affect the actual image. For this reason, a signal to noise (S/N) ratio obtained by dividing a signal value by the noise amount may be used as the estimation result.

The noise estimating unit 502 compares the estimated noise amount with a preset threshold, and if determines that the image has a little noise, the resolution converting unit 503 generates a low-resolution image (S605). In contrast, if the noise estimating unit 502 determines that the image has much noise, the high-resolution image is not used for training, and the processing ends. In other words, the resolution converting unit 503 corresponds to an obtaining unit configured to convert the resolution of a medical image of the first resolution selected based on the noise amount estimated by the noise estimating unit 502 and obtaining a medical image of the second resolution lower than the first resolution.

If an image with much noise is used for learning, the CNN learns increasing the resolution of not only the signal component but also the noise component, which causes degradation of the quality of superresolution images. For this reason, if an image with much noise is input, the image is not used for learning.

This embodiment measures the amount of the noise in high-resolution images. Alternatively, the noise in the high-resolution images may be reduced, and the noise amount may be measured from the noise-reduced high-resolution images. The noise amount may be estimated not from the high-resolution images but from the low-resolution images.

Third Embodiment

The processing will be described with reference to the functional block diagram in FIG. 5 and the flowchart in FIG. 7 illustrating the overall processing procedure.

The steps from S701 to S703 are the same as the steps from S601 to S603 in the second embodiment, and descriptions thereof are omitted.

The noise estimating unit 502 receives high-resolution images, estimates the amount of noise in the high-resolution images, and outputs the noise amount (S704). The method of estimation is the same as that of the second embodiment, and a description thereof is omitted. The steps from S705 to S706 are the same as the steps from S605 to S606 in the second embodiment, and descriptions thereof are omitted.

The machine learning unit 504 performs training of the CNN using the preprocessed low-resolution images and the preprocessed high-resolution images (S707).

Figure 4A:
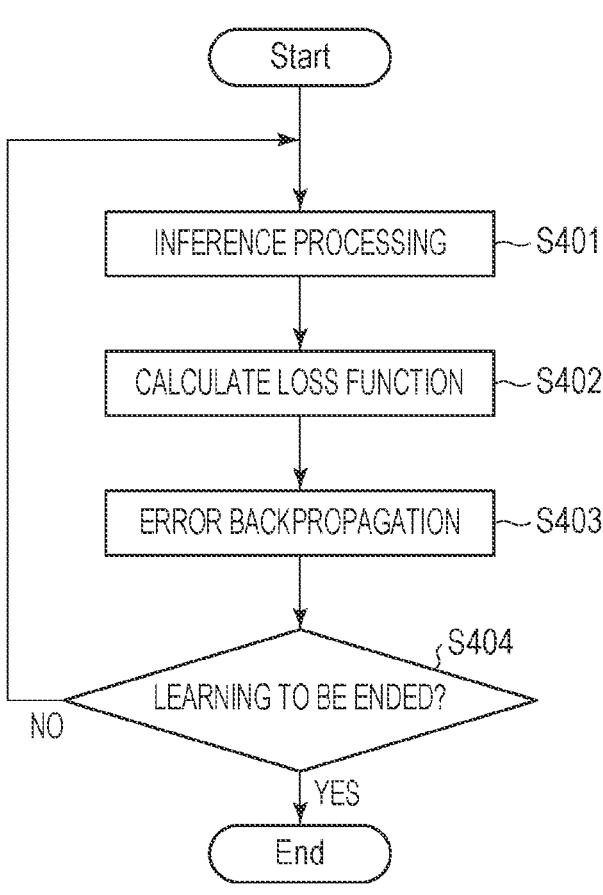
FIG. 4A is a flowchart for an example of the learning procedure of the medical-image processing apparatus according to the first embodiment.
Figure 4B:
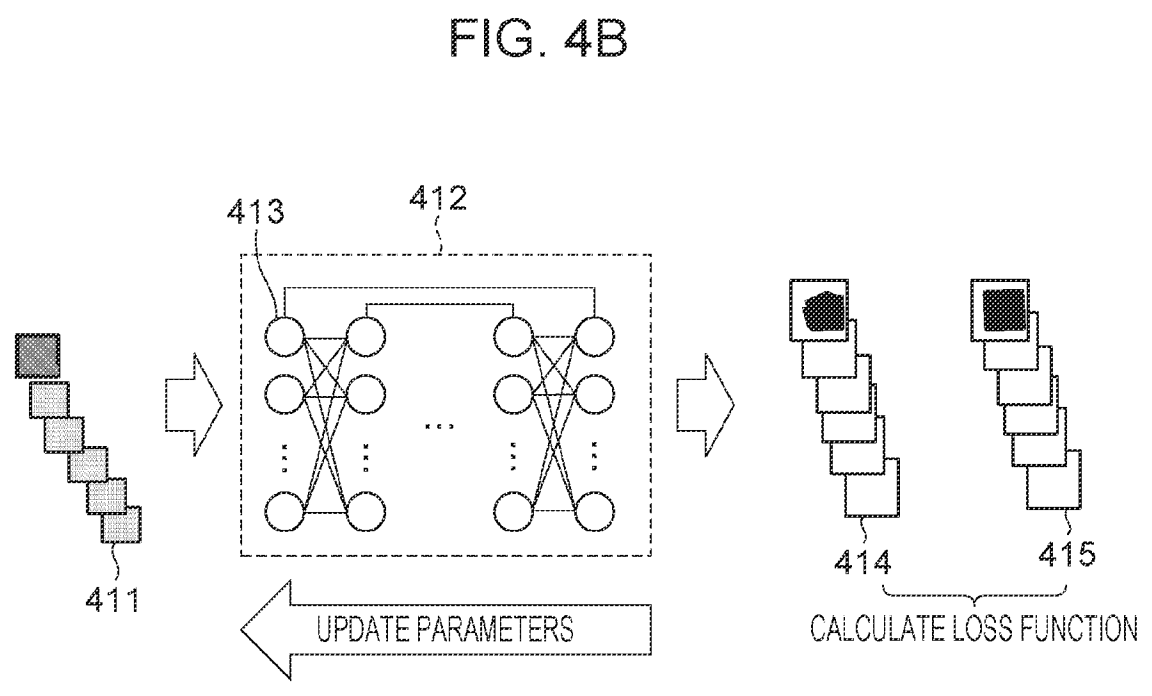

The procedure of learning is illustrated in FIGS. 4A and 4B. The machine learning unit 104 performs inference processing on the low-resolution images 411 using the parameters of the CNN 412 in the course of learning and outputs the superresolution images 414 as inferences (S401). Next, the machine learning unit 104 calculates a loss function from the superresolution images 414, which are inferences, and the high-resolution images 415 (S402). Next, the machine learning unit 104 performs error backpropagation starting from the loss function calculated at S402 to update the parameter set of the CNN 412 (S403).

To reduce the influence on the noise, the machine learning unit 104 changes the training rate of the parameter update of the CNN 412 according to the calculated noise amount calculated at S704. A gradient descent method is generally used to determine the parameters of the CNN 412. The parameter W of the CNN 412 is updated in the gradient descent method, as expressed as Eq. 4.

$$W := W - \alpha \nabla J(W)$$

where J is an error in the parameter W, :=is assignment operation, $\nabla$ is gradient, and $\alpha$ is a training rate. Decreasing the value of $\alpha$ decreases the reflection of the error J on the parameter W, and increasing the value of $\alpha$ increases the reflection of the error J on the parameter W. If the noise amount calculated at S704 is large, the learning is for decompressing not the signal components but the noise components. For this reason, the training rate a is decreased to update the parameter W of the CNN 412 so as to reduce the influence on the noise. The relationship between the noise amount and the training rate a may be changed continuously or discretely.

To reduce the influence on the noise, the loss function may be changed according to the noise amount calculated at S704. Examples of the loss function include a loss L1 and a loss L2, which are expressed as Eq. 5 and Eq. 6, respectively.

$$L1 = |SR - HR|$$

$$L2 = (SR - HR)^2$$

where SR is a superresolution image, which is an output of the learning model, and HR is a correct image in the training data.

The loss L1 tends to be smaller in value than the loss L2 when the difference between the images, making the error less likely to reflect the parameter. Accordingly, using the loss L1 when the noise amount is large reduces the influence on outliers related to the noise. In other words, the loss function may be set so that the output of data with much noise is smaller than data with a little noise becomes smaller as the error increases.

The machine learning unit 104 determines whether to continue the learning on the basis of the magnitude of the error or the like (S404). If the learning is to be continued, learning is performed again using the updated parameters of the CNN 412. In contrast, if the learning is not to be continued, the updated parameters of the CNN 412 are the finalized parameters.

Other Embodiments

It is to be understood that the present invention can also be implemented by supplying a program for implementing one or more functions of the above embodiments to a system or an apparatus via a network or a storage medium and by reading and executing the program with one or more processors of the computer of the system or the apparatus. The present invention can also be implemented by a circuit for performing one or more of the functions.

The processor or the circuit can include a central processing unit (CPU), a microprocessing unit (MPU), a graphics processing unit (GPU), an application specific integrated circuit (ASIC), and a field programmable gateway (FPGA). The processor or the circuit can include a digital signal processor (DSP), a data flow processor (DFP), and a neural processing unit (NPU).

The medical-image processing apparatuses according to the embodiments may be realized as stand-alone apparatuses or may be a communicable combination of a plurality of apparatuses combined so as to execute the above processes, both of which are included in the embodiments of the present invention. The above processes may be executed by a common server or a server group. The plurality of units constituting each medical-image processing apparatus only needs to be able to communicate with one another at a predetermined communication rate and does not have to be present in the same facility or in the same country.

The embodiments of the present invention include a configuration in which a program of software for implementing the functions of the above embodiments is supplied to a system or an apparatus and the computer of the system or the apparatus reads and executes the code of the supplied program.

Accordingly, the program code installed in a computer to implement the processes according to the embodiments is also one of the embodiments of the present invention. The functions of the embodiments can also be implemented by part or all of the actual processes performed by an operating system (OS) operating in the computer according to instructions included in a program read by the computer.

The present invention provides a learning model capable of outputting medical images of improved resolution and reduced noise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A medical-image processing apparatus comprising:
   one or more processors; and
   at least one memory storing executable instructions, which when executed by the one or more processors, cause the medical-image processing apparatus to perform operations comprising:
   converting resolution of a medical image of a first resolution subjected to a noise reduction process to obtain a medical image of a second resolution lower than the first resolution; and
   training a learning model using (A) training data including the medical image of the first resolution subjected to the noise reduction process and the medical image of the second resolution, and (B) a training parameter determined based on a noise amount of the medical image of the first resolution.

2. The medical-image processing apparatus according to claim 1, the operations further comprising:
   performing the noise reduction process on the medical image of the first resolution,
   wherein the converting converts the resolution of the medical image of the first resolution subjected to the noise reduction process to obtain the medical image of the second resolution lower than the first resolution.

3. The medical-image processing apparatus according to claim 2,
   wherein the performing performs the noise reduction process on the medical image of the first resolution using a nonlinear spatial filter.

4. The medical-image processing apparatus according to claim 2,
   wherein the performing performs the noise reduction process by averaging the medical image of the first resolution and a plurality of medical images captured under the same image-capturing conditions as conditions for the medical image of the first resolution.

5. A medical-image processing apparatus comprising:

one or more processors; and at least one memory storing executable instructions, which when executed by the one or more processors, cause the medical-image processing apparatus to perform operations comprising:

estimating a noise amount of a medical image of a first resolution;

converting resolution of the medical image of the first resolution selected based on the estimated noise amount to obtain a medical image of a second resolution lower than the first resolution; and training a learning model using (A) training data including the medical image of the first resolution and the medical image of the second resolution, and (B) a training parameter determined based on a noise amount of the medical image of the first resolution.

6. The medical-image processing apparatus according to claim 5, wherein the estimating estimates the noise amount of the medical image of the first resolution based on at least one of a standard deviation of a noise amount in a predetermined area of the medical image of the first resolution, an average of standard deviations in a plurality of areas of the medical image of the first resolution, medical physical properties, and a ratio of a signal value to the noise amount of the medical image of the first resolution.

7. The medical-image processing apparatus according to claim 5, wherein, when the estimated noise amount is less than a predetermined threshold, the converting converts the resolution of the medical image of the first resolution to obtain the medical image of the second resolution lower than the first resolution.

8. The medical-image processing apparatus according to claim 1, wherein the training parameter includes a training rate, and wherein, when the noise amount is a predetermined value or more, the training rate is less than a training rate when the noise amount is less than the predetermined value.

9. The medical-image processing apparatus according to claim 8, wherein the training parameter includes a loss function, and wherein, when the noise amount is the predetermined value or more, the loss function is smaller than a loss function when the noise amount is less than the predetermined value.

10. The medical-image processing apparatus according to claim 1, wherein the medical image comprises a radiographic image.

11. A medical-image processing apparatus comprising:

one or more processors; and at least one memory storing executable instructions, which when executed by the one or more processors, cause the medical-image processing apparatus to perform operations comprising:

obtaining a medical image obtained by capturing an image of an examinee; and generating a medical image of a resolution higher than a resolution of the obtained medical image using a learning model that has learned using (A) training data including a medical image of a first resolution subjected to a noise reduction process and a medical image of a second resolution lower than the first resolution, the medical image of the second resolution being generated by converting resolution of the medical image of the first resolution subjected to the noise reduction process, and (B) a training parameter determined based on a noise amount of the medical image of the first resolution.

12. The medical-image processing apparatus according to claim 11, wherein the training parameter includes a training rate, and wherein, when the noise amount is a predetermined value or more, the training rate is less than a training rate when the noise amount is less than the predetermined value.

13. The medical-image processing apparatus according to claim 12, wherein the training parameter includes a loss function, and wherein, when the noise amount is the predetermined value or more, the loss function is smaller than a loss function when the noise amount is less than the predetermined value.

14. The medical-image processing apparatus according to claim 12, wherein the training parameter includes a loss function, wherein the loss function when the noise amount is more than the predetermined value is an absolute value of an error between an output image output from the learned model and a correct image, and wherein the loss function when the noise amount is less than the predetermined value is a square of the error.

* * * * *